United States Patent [19]

Mallya et al.

[11] Patent Number: 4,944,888
[45] Date of Patent: Jul. 31, 1990

[54] SUSPENSION POLYMERIZATION IN AN ORGANIC MEDIUM

[75] Inventors: Prakash Mallya, Pasadena; Yehuda Ozari, Arcadia; Colin C. Smith, Glendale, all of Calif.

[73] Assignee: Avery International Corporation, Pasadena, Calif.

[21] Appl. No.: 319,530

[22] Filed: Mar. 6, 1989

Related U.S. Application Data

[63] Continuation-in-part of Ser. No. 138,509, Dec. 23, 1987, Pat. No. 4,810,763.

[51] Int. Cl.$^5$ .............................................. B01D 21/26
[52] U.S. Cl. ..................................................... 210/787
[58] Field of Search .............................. 210/787, 634

[56] References Cited

U.S. PATENT DOCUMENTS 3,823,145  7/1974  Louvar et al. ...................... 210/787
4,434,061  2/1984  McDowell .......................... 210/787

FOREIGN PATENT DOCUMENTS 0159062  2/1983  Fed. Rep. of Germany ...... 210/787
0032698  2/1983  Japan .................................. 210/787
0933112  6/1982  U.S.S.R. ............................. 210/787

Primary Examiner—Joseph L. Schofer
Assistant Examiner—N. Sarofin
Attorney, Agent, or Firm—Christie, Parker & Hale

[57] ABSTRACT

Inherently tacky infusible pressure-sensitive adhesive microspheres prepared by polymerizing at least one monomer which when polymerized will form a pressure-sensitive adhesive having a glass transition temperature less than about −20° C. in a medium in which the monomer is substantially insoluble and in the presence of a surfactant and a suspension stabilizer which are soluble in the organic medium and substantially insoluble in the monomer under conditions of shear sufficient to form suspended particles of a size less than 200 microns. The formed microspheres are transferred to a volatile organic medium and separated from the medium in which they were formed by a centrifugal separator at a force of at least 2,000 times the force of gravity.

6 Claims, 1 Drawing Sheet

EFFECT OF CENTRIFUGAL FORCE AND TIME ON SEPARATION

EFFECT OF TIME ON SEPARATION AT VARIOUS g's

SUSPENSION POLYMERIZATION IN AN ORGANIC MEDIUM

This application is a continuation-in-part of application Ser. No. 138,509, filed Dec. 23, 1987, now U.S. Pat. No. 4,810,763.

BACKGROUND OF THE INVENTION

The present invention relates to the production of normally tacky pressure-sensitive adhesive microspheres useful in the production of removable and repositionable note paper tape and label products.

The mid-1970's saw the introduction of removable and repositionable note papers which have found broad acceptance in the marketplace. The adhesives utilized in some of the products were infusible, inherently tacky, elastomeric microspheres prepared by an aqueous suspension polymerization process. Aqueous suspension polymerization processes are described, for instance, in U.S. Pat. No. 3,691,140 to Silver, U.S Pat. No. 4,166,152 to Baker et al., U.S. Pat. No. 4,495,318 to Howard, U.S. Pat. No. 4,598,212 also to Howard, and U.S. Pat. No. 4,786,696 to Bohnel, each incorporated herein by reference.

The problem with adhesive microspheres produced by an aqueous suspension polymerization process is that there is often a need to recover the microspheres from the medium in which they are prepared, then redisperse them in a organic solvent for application to paper or another substrate. This procedure is required in the instance of paper because the presence of water will cause paper to which the adhesive microspheres are applied to curl.

It has also been stated in connection with the production of removable and repositionable products that if the adhesive force provided is too small, the product will literally fall off the surface to which it is applied, and if too great, will tear or delaminate paper surfaces at normal removal rates. Application of the adhesive coatings so as to achieve peel values within a desired range requires therefore considerable know-how.

A considerable reduction in manufacturing costs and better control over the product performance can result if the adhesive is prepared where the medium can be effectively used to control particle size and therefore adhesion and also where there can be eliminated the need to recover the adhesive from the medium in which it is prepared by a tedious and expensive step such as coagulation. This application is a continuation-in-part of application Ser. No. 07/138,509, filed 12/23/87, Now U.S. Pat. No. 4,810,763.

SUMMARY OF THE INVENTION

According to the present invention there is provided a process for separating suspension polymerized inherently tacky microspheres from the media in which they are prepared, which process comprises applying a centrifugal force of at least 2,000 times the force of gravity, preferably at least 10,000 times the force of gravity, to a mixture comprising the media in which the microspheres were formed, the microspheres and a more volatile media in which the microspheres preferentially disperse and more preferentially swell and which is insoluble in the media in which the microspheres are formed. Separation of the media in which the microspheres were formed from the volatile media containing the microspheres can occur within about three minutes, preferably one minute, and on a continuous basis using disc centrifugation.

THE DRAWINGS

FIGS. 1 and 2 show the effect of centrifugal force on the separation times of inherently tacky microspheres from the media in which they are prepared. In particular, FIG. 1 shows the effect of centrifugal force on the volume of polymerization [ethylene glycol (EG)] media separated from the microspheres in heptane while FIG. 2 shows the separations as a function of time for three different centrifugal forces.

DETAILED DESCRIPTION

Figure 1:
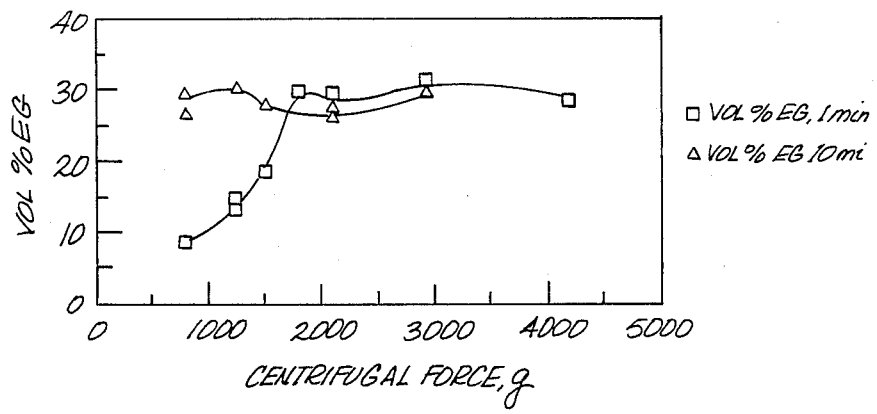

According to the present invention, there is provided method of recovery of inherently tacky, infusible, pressure-sensitive adhesive microsphere polymers produced by suspension polymerization for use in the production of removable and repositionable products such as labels, note paper, tapes and the like.

The tacky microspheres are prepared in a medium which may be aqueous or organic and in which at least the principal or bulk of the monomers are substantially insoluble preferably in the presence of a suitable suspension stabilizer and surfactant. Shear may be effectively used.

Aqueous methods are described in detail in U.S. Pat. No. 3,619,140 to Silver, 4, 166,152 to Baker et al., 4,495,318 to Howard, 4,598,112 to Howard and 4,786,696 to Bohnel, each incorporated herein by reference. The following is devoted to microsphere preparation in an organic medium. An organic medium which is useful includes polyols such as diols, triols and other media in which the principal monomer or monomers to be polymerized are insoluble. The presently preferred organic medium is ethylene glycol.

The principal monomers which can be homopolymerized or copolymerized are those which are insoluble in the organic medium and constitute the bulk of the monomers present in the suspension. They include alkyl acrylate esters such as isooctyl acrylate, 2-ethyl hexyl acrylate, butyl acrylate, sec-butyl acrylate, methyl butyl acrylate, 4-methyl 2-pentyl acrylate and the like. Comonomers which can be used are unsaturated mono and dicarboxylic acids such as methacrylic acid, acrylic acid, fumaric acid and the like. Other comonomers include dibutyl fumarate and the like, methacrylates such as methyl methacrylate, isodecyl methacrylate and the like, styrene, vinyl acetate and the like. All that is required is that the principal monomers be substantially insoluble in the medium and be homopolymerizable or copolymerizable in suspension droplet form to form an infusible product which is an inherently tacky pressure-sensitive adhesive having a glass-transition temperature of less than about $-20°$ C. It is presently preferred to employ as monomers 2-ethyl hexyl acrylate and methacrylic acid in which the methacrylic acid content is from 0 to about 5 percent by weight of the monomers. Methacrylic acid is particularly preferred when the medium is ethylene glycol since it is relatively more soluble in 2-ethyl hexyl acrylate compared to the other acids, helps speed up the reaction, and a substantial portion copolymerizes with 2-ethyl hexyl acrylate.

Polymerization preferably occurs in the presence of a monomer soluble initiator such as benzoyl peroxide, chloro methyl benzoyl peroxide, lauroyl peroxide, decanoyl peroxide and the like. The concentration of the initiator is from about 0.15 to about 0.5 percent by weight of the monomers preferably about 0.25 percent by weight of the monomers. Benzoyl peroxide is presently preferred. Autogenous reaction conditions are required for peroxide initiators.

Actinic radiation and electron beam radiation may also be used to initiate the polymerization process.

A suspension stabilizer is required to prevent coalescence of the polymer particles formed during polymerization. A suspension stabilizer may be an anionic suspension stabilizer such as polyacrylic acid, polymethacrylic acid, copolymers of acrylic or methacrylic acids with acrylamide, vinyl pyrrolidone or dimethyl amino ethyl methacrylate and the like, and nonionic suspension stabilizer such as polyvinyl pyrrolidone, partially hydrolyzed polyvinyl acetate, and cationic stabilizers such as quaternized polydimethyl aminoethyl methacrylate and the like, and amphoteric stabilizers such as quaternized copolymers of acrylic acid and dimethylaminoethyl methacrylate and the like, as well as mixtures thereof. The suspension stabilizer must be soluble in the organic medium but substantially insoluble in the monomers. Concentration of suspension stabilizer typically employed is from about 3 to about 15 percent by weight of the monomers preferably from about 7 to 8 percent by weight of the monomer.

A surfactant is required in addition to the stabilizer for optimum stability in a concentration which may or may not be above its critical micelle concentration. Typical concentrations range from about 0.25 to about 3 percent by weight preferably about 1 percent by weight of the monomers when the medium is ethylene glycol. Anionic surfactants are preferred for anionic and nonionic stabilizers and cationic surfactants for cationic suspension stabilizers.

Typical anionic surfactants that can be used are sulfosuccinates and alkyl aryl polyether sulfonates. Sulfosuccinates include sodium dioctyl sulfosuccinate (Aerosol OT, manufactured by American Cyanamid) and sodium dihexyl sulfosuccinate (Aerosol MA, manufactured by American Cyanamid), sodium alkyl aryl polyether sulfonates (Triton X-200, manufactured by Rohm and Haas) and sodium alkyl benzene sulfonate such as sodium dodecyl benzene sulfonate (Siponate DS-10, manufactured by Alcolac). Nonionic surfactants that can be used are alkyl arylpolyether alcohols (Triton N-111, manufactured by Rohm & Haas) and the like, and these are preferably used in combination with anionic surfactants. Cationic surfactants of the type cetyl trimethyl ammonium bromide can be used instead of anionic surfactants in combination with cationic stabilizers.

pH will range from about 4 to about 7.5 for anionic stabilizers or combinations with nonionics and a pH range of 4 to 5 is preferred for nonionic suspension stabilizers.

Some degree of internal polymer cross-linking is required for cohesive strength and to achieve infusibility. One way to achieve this is by hydrogen abstraction using a peroxide initiator. Another way is to employ a multifunctional additive such as multifunctional acrylate, trialyl cyanurate and the like during polymerization to allow cross-linking reactions to occur to control gel content. As the gel content is increased, the modulus of the polymer increases as well. A low modulus is desired to get quick wetting and bond formation on surfaces on which the label is applied. Hence, an optimum balance between gel content and modulus is necessary to get good performance characteristics. Cationic and/or amphoteric comonomers can be used to change the specific adhesion characteristics to certain substrates. Amphoteric monomers include betaines such as 1-(3-sulphopropyl)-2-vinyl pyridinium betaine and the like.

Water need not be present but can be tolerated so long as the water content does not cause curl upon application of the product to a paper substrate. Low levels are desirable.

Shear, as induced by agitation, is required and is used effectively to control particle size. It is presently preferred that sufficient shear be induced to provide a particle size smaller than about 200 microns, preferably smaller than about 90 microns. When the level of shear is too high, there is tendency for the formed particles to be so fine that on application to a substrate at moderate coat weights it will perform like a continuous film. Such a film would show low adhesion to rough surfaces which is not desirable. If shear is too low, particles of too great a size will be formed and tend to be too aggressive due to the high peel force per point of contact and increase the probability, for products removable from paper, of inducing fiber pick or paper tear. Preferably shear rates sufficient to provide particles smaller than about 200 microns should be used.

Salts such as sodium chloride and lithium chloride, which are soluble in the continuous organic phase, can be effectively used to reduce solubility of monomers in the medium, to control viscosity of the medium and in combination with shear also control particle size. Salts are typically present in levels 0.5 to 10% by weight of the monomers.

Gel content, as determined by extraction with tetrahydrofuran, can range from 60 to 80 percent by weight of the polymer preferably about 65 to about 75 percent.

Polymerization in the organic medium eliminates the need to recover the microspheres from the medium particularly when the microspheres are applied to a paper substrate. It is because the organic medium will not cause curl of a paper substrate. When ethylene glycol or glycerol is the medium, their boiling points are too high for rapid evaporation. Accordingly, it is desirable where the media is organic for the production of removable and repositionable products having a paper substrate to transfer the microspheres to a more volatile medium such as heptane for coating onto paper.

The first step, where is desired, is to transfer the microspheres to a more volatile media, which procedure is necessary where the polymerization medium is aqueous and expeditious where it is organic. The procedure which may preferably be followed is to add a volatile organic medium such as heptane in which the adhesive microspheres swell, but do not dissolve. The problem exists in effecting a good separation between the medium in which the polymer microspheres were formed and the more volatile medium. This problem then becomes one of separating the medium from the microsphere/volatile medium.

It was, however, found that employing a centrifugal force at least two thousand times the force of gravity or more, preferably ten thousand times the force of gravity (g) or more, one can achieve excellent separation within acceptably short times and by the use of centrifugal disc separation to enable separation on a continuous basis.

Of centrifugal separators available, basket centrifuges go up to a maximum of twenty-two hundred times the force of gravity, and if operated at a centrifugal force of about 2,000 times the force of gravity or more, enables an economically effective separation within about one to three minutes. The same is true of a D-Canter type centrifuge.

It is preferred, however, to simply add a centrifuge or its equivalent, having the ability of developing centrifugal separation force of ten thousand times the force of gravity allowing separation of the media in which the microspheres were formed from a more volatile media in which they are transferred.

FIG. 1 shows for a mixture initially containing 30% by volume ethylene glycol and any water introduced for suspension polymers, and a dispersion of the microspheres in heptane, the volume per cent of the ethylene glycol removed as a function of centrifugal force. As can be seen at about two thousand times the force of gravity, complete separation occurs rapidly, i.e., about one minute, whereas an equivalent amount of separation can occur in much more protracted times with lower gravitational force.

Figure 2:
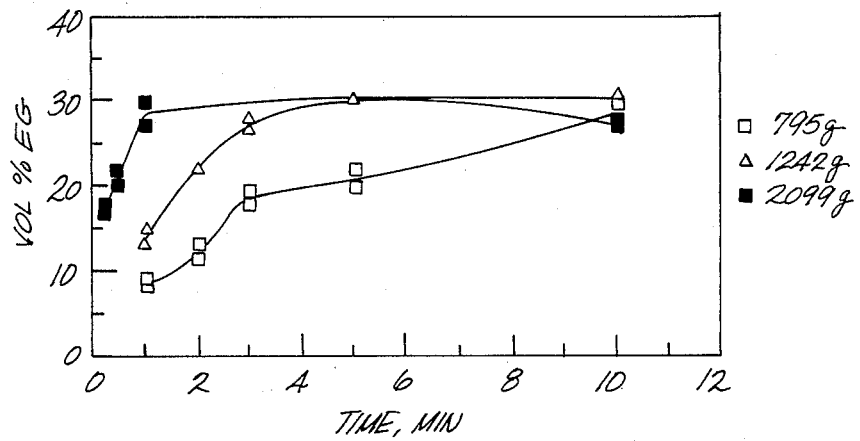

FIG. 2 establishes that below the force of two thousand times the force of gravity, protracted times are required to achieve effective separation of the reaction medium, while at a force of two thousand times the force of gravity essentially complete separation occurs within one minute's time.

Where the media is aqueous, there is a need to recover the particles from the medium in which they are formed. A centrifugal separation is important to achieve this result. Gravity separation or low-energy centrifugation, if desired, can be used to remove the bulk of the medium in which the microspheres are prepared and the microspheres and residue of the medium simply incorporated into a more volatile organic medium and high gravitational centrifugal separation employed in accordance with the invention to achieve the rest of the separation.

A discontinuous coating can be achieved in part by swelling of the polymer particles in the more valuable medium to ensure a separation of particles from each other upon evaporation of the medium and shrinkage of the particles. In any event, particles will remain discrete and will not fuse even at higher solids concentrations due to the fact that each particle is cross-linked and is incapable of continuous film formation.

To achieve a removable and repositionable product, it is preferably desirable to have a solids content in the medium in which the particles are dispersed, which is inversely proportional to particle size so as to limit the area of the particles available for contact with a surface to which the net product is applied. Larger particles show a higher tendency to transfer onto substrates after substantial dwell times compared to smaller particles due to the fact that contact area and specific adhesion per particle is higher.

The recovered adhesive microspheres in the volatile media may be applied directly to paper and other substrates. Priming may be desirably used to improve anchorage to the paper and minimize transfer of microspheres to substrates. For some microspheres, such as microspheres prepared from a copolymer of 2-ethyl hexyl acrylate and methacrylic acid, a particularly useful primer is zinc oxide in an acrylic base polymer. This is coated on the paper and dried before coating the dispersion of microspheres. The particles will adhere better to such a primed surface due to the interaction between the acid groups present in the polymer and $Zn^{+2}$ present in the primer.

Products produced in accordance with the present invention generally comprise discontinuous coat of adhesive microspheres on at least a portion of at least one side of the carrier material and present in an amount to provide, in the zone bounded or defined by the adhesive, from about 10% to about 30%, preferably from about 15% to about 25%, of the adhesive present in the pattern, available for contact with a smooth substrate, such as stainless steel or glass, relative to the amount of adhesive which would have been present if the adhesive were applied as a continuous film. To achieve this level for effective contact, from about 30% to about 75% of the zone which would have been occupied by a continuous film, is covered by pressure-sensitive microspheres. The segments have an average height of at least from about 15 microns, preferably at least about 20 microns to account for the roughness of the face material and the surface to which the product is to be applied.

The following examples are illustrative, but no wise limiting of the instant invention.

EXAMPLE 1

There was formed a mixture of 10 grams sodium chloride, 215 grams ethylene glycol, and 72 grams Acrysol HV-1 (a ten percent solution of a polyacrylic acid in water). And to this there was added with agitation a solution of 99 grams of 2-ethyl hexyl acrylate, 1 gram methacrylic acid and 0.25 gram benzoyl peroxide, the reaction mixture was agitated at 400 rpm under nitrogen purge after the addition of the mixture of 2-ethyl hexyl acrylate, methacrylic acid and benzoyl peroxide. There was then added to the reactor 3.57 g of 28% solution of Triton X-200 in 8.0 grams of ethylene glycol. After 4.5 hours of reaction at 65° C., there were formed tacky microsphere particles having a particle size of less than about 90 microns. The gel content of the microspheres as determined by extraction with tetrahydrofuran for 48 hours was found to be 74%. The mixture was mixed with heptane to an ethylene glycol content of about 30% by volume of the mixture.

Separations were effected at several gravitational levels. The results are shown in FIGS. 1 and 2.

EXAMPLE 2

The composition of ethylene glycol, water and microspheres transferred to heptane were separated on a continuous basis.

What is claimed is:

1. In a process for the formation of inherently tacky, adhesive microspheres by suspension polymerization in a first liquid media in which the microspheres are insoluble and formed followed by addition of a volatile organic liquid second media to which the formed microspheres are substantially transferred from the first media to form a mixture of the first media and second media containing the microspheres, the improvement which comprises continuously subjecting the mixture in a disc separation to a centrifugal force in excess of about 2,000 times the force of gravity for a time sufficient to separate the first media from the second media containing the microspheres.

2. A process as claimed in claim 1 in which separation occurs in a time less than about three minutes.

3. A process as claimed in claim 1 in which the centrifugal force exceeds about 10,000 times the force of gravity.

4. A process as claimed in claim 1 in which the centrifugal force exceeds about 10,000 times the force of gravity and separation occurs within one minute.

5. A process as claimed in claim 1 in which the first medium is present in an amount of about 30% by volume based on the volume of the first medium and the second medium.

6. A process as claimed in claim 3 in which the first medium is present in an amount of about 30% by volume based on the volume of the first medium and the second medium.

* * * * *